(No Model.)
W. H. ADAMS.
CORN AND COTTON SCRAPER.
No. 352,107. Patented Nov. 9, 1886.
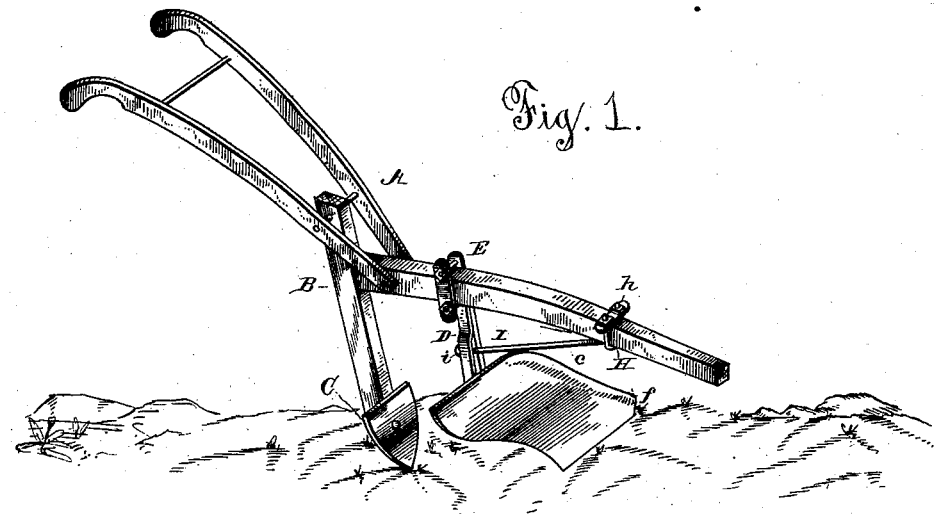
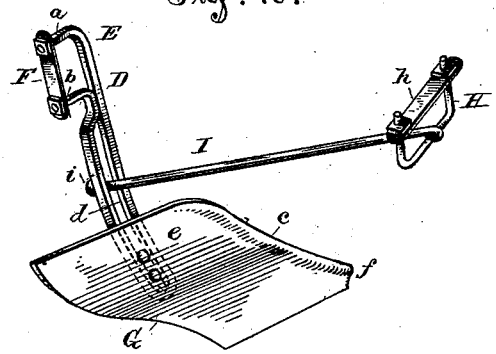
WITNESSES
William H. Adams
INVENTOR
Attorney

United States Patent Office.

WILLIAM HINYARD ADAMS, OF WHARTON, ASSIGNOR OF ONE-HALF TO JAMES LITTLETON DAVIS, OF WHARTON COUNTY, TEXAS.

CORN AND COTTON SCRAPER.

SPECIFICATION forming part of Letters Patent No. 352,107, dated November 9, 1886.

Application filed May 19, 1886. Serial No. 202,674. (No model.)

*To all whom it may concern:*

Be it known that I, WILLIAM HINYARD ADAMS, a citizen of the United States, residing at Wharton, in the county of Wharton and State of Texas, have invented certain new and useful Improvements in Corn and Cotton Scrapers; and I do hereby declare the following to be a full, clear, and exact description of the invention, such as will enable others skilled in the art to which it appertains to make and use the same, reference being had to the accompanying drawings, which form part of this specification.

The object of my invention is to provide an improved corn and cotton scraper for turning or shovel plows for the cultivation of cotton, corn, and other plants, which is adapted to be attached to the beam of the plow without weakening the same by cutting or boring. The scraper is so arranged as to be adjusted either to the right or left, as desired, and up and down, on a central slotted foot-piece, by means of which the line of draft on the blade of the scraper is at all times the same as that on the beam of the plow; and it consists in the construction hereinafter described, and more particularly pointed out in the claims.

Figure 1 represents a plan view of my improved device attached to a shovel-plow, ready for use. Fig. 2 is a plan view of the improvement detached from the plow.

Like letters of reference refer to corresponding parts in each of the drawings.

A represents an ordinary shovel-plow having a depending arm, B, from the rear end of the beam to the front of the lower end of which is secured the shovel C.

D is a foot-piece having a clevis-band, E, at its upper end, formed integral therewith, for attaching it to the rear portion of the beam of the plow. The outer or land side of the foot-piece is made to extend to the top of the clevis, and is then turned inward at right angles to the side to form the upper arm, $a$, of the clevis-band, while the inner side of the foot-piece extends upward to within a short distance below the clevis portion, where it is turned outward and welded to the landside of the foot-piece, to a height less than the outer one, equal to a little more than the thickness of the plow-beam, and is turned inward at right angles to the side to form the lower arm, $b$, of the clevis-band. These two arms, being turned in the same direction, are screw-threaded on their ends, and after being placed on the plow-beam from the side are secured thereon by means of a plate, F, placed on the projecting ends of the arms, which is held in place by suitable nuts.

From a short distance below the clevis E the foot-piece D is slightly curved to its lower end to fit the curvature of the scraper. Within the curved portion of the foot-piece a vertical slot, $d$, extends from its upper part to near the lower end, of sufficient width to enable an adjusting-rod to be moved up and down therein.

On the front of the curved foot-piece D is adjustably secured a diamond-shaped scraper, curved on its back to conform to the foot-piece, and so adjusted as to bring its elevated or land side $c$ on a parallel line with the beam of the plow. The scraper is provided with a series of holes, $e$, through which it is adjustably secured in the slot of the foot-piece by means of bolts and nuts. A series of these holes are provided in the scraper to enable it to be given any degree of side adjustment desired. The elevated or land side $c$ of the scraper is curved upward and outward across its main curvature from front to back and terminates in front in a dull point, $f$. By means of this side curve, $c$, on the scraper the surface dirt and weeds are given a roll on the blade and thrown to the opposite side and off the scraper and away from the plant, thereby preventing an accumulation or clogging of dirt upon the scraper-blade.

Upon the front part of the beam of the plow there is placed an adjustable band, H, which is secured on the beam by means of screw-nuts and a plate, $h$, over the side arms of the band which projects above the beam.

To the under side of the band H and beneath the plow-beam there is fixed an adjusting-rod, I, which extends through the slot $d$ in the foot-piece D, and has upon its rear end a cross-head, $i$, which enables it to be passed through the slot and given a half-turn to hold it therein before the band H is fixed upon the beam. By this construction the band H may be moved forward on the beam and secured in place, adjusting the scraper G to any desired height by means of the attached rod I through the slot $d$ of the foot-piece, and by a backward movement of the band upon the beam the scraper may be lowered, so that it will cut into and turn a deeper portion of the earth and weeds away from the plant, and at all times the line of draft on the scraper will be the same as that on the beam of the plow.

My device, being simple in construction, can be readily applied to ordinary plows in use, and is capable of the adjustment necessary to adapt it to the position and character of the ridges to be scraped.

Having fully described my improved device, what I claim, and desire to secure by Letters Patent of the United States, is—

1. In a corn and cotton scraper, a foot-piece consisting of an outer or land side extending upward and turned inward at its top to form one side of a clevis, and an inner side integral therewith extending upward, forming a slot from its lower end, to within a short distance below the clevis portion, and turned outward to the landside and welded thereto, the upper end of the inner side being turned inward to form the bottom of the clevis, substantially as shown, and for the purpose set forth.

2. In a corn and cotton scraper, the combination, with a foot-piece adapted for attachment to the rear portion of the beam of a plow, and having a vertical slot from near its beam portion to its lower end, with a scraper curved substantially as described, and adjustably secured thereon, of a band adapted to be attached to the front portion of the beam, having one end of an adjusting-rod secured to its under side and the other end of the rod adapted to work in the slot of the foot-piece to adjust the scraper up and down, as described, and for the purpose set forth.

In testimony whereof I affix my signature in presence of two witnesses.

WILLIAM HINYARD ADAMS.

Witnesses:
G. G. KELLEY,
B. D. KING.